United States Patent
Takarabe

(10) Patent No.: US 10,771,648 B2
(45) Date of Patent: Sep. 8, 2020

(54) COMMUNICATION APPARATUS AND CONTROL METHOD THEREFOR

(71) Applicant: CANON KABUSHIKI KAISHA, Tokyo (JP)

(72) Inventor: Kei Takarabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 16/016,790

(22) Filed: Jun. 25, 2018

(65) Prior Publication Data

US 2019/0007574 A1    Jan. 3, 2019

(30) Foreign Application Priority Data

Jun. 29, 2017 (JP) .................................. 2017-127834
Apr. 23, 2018 (JP) .................................. 2018-082464

(51) Int. Cl.
  *H04N 1/00*   (2006.01)
  *G06F 1/26*   (2006.01)
  (Continued)

(52) U.S. Cl.
  CPC ....... *H04N 1/00891* (2013.01); *H04L 12/282* (2013.01); *H04W 12/003* (2019.01);
  (Continued)

(58) Field of Classification Search
  CPC .............................. G06F 1/3203; G06F 1/3287
  See application file for complete search history.

(56) References Cited

U.S. PATENT DOCUMENTS 9,727,809 B2 * 8/2017 Nagasawa .......... G06K 15/4095
9,832,302 B2 * 11/2017 Takeuchi ............ H04M 1/7253
(Continued)

FOREIGN PATENT DOCUMENTS

CN         105023419 A     11/2015
CN         104680213 A      6/2016
(Continued)

OTHER PUBLICATIONS

European Search Report dated Nov. 6, 2018, in related European Patent Application No. 18179807.5.
(Continued)

*Primary Examiner* — Brian T Misiura
(74) *Attorney, Agent, or Firm* — Venable LLP

(57) ABSTRACT

A communication apparatus includes a first communication portion configured to perform wireless communications with an external apparatus based on a Bluetooth Low Energy communication scheme, and at least one processor configured to cause the communication apparatus to act as a first determiner that determines whether an auto power-on function of powering on the communication apparatus under a predetermined condition even when the communication apparatus is in a powered-off state is set to be enabled. In a case where the first determiner determines that the auto power-on function is set to be enabled, the first communication portion disconnects, in response to a power-off instruction, connection to the external apparatus, which has been established based on the Bluetooth Low Energy communication scheme, and transmits advertising information that allows a response based on the Bluetooth Low Energy communication scheme to be received.

14 Claims, 9 Drawing Sheets

(51) Int. Cl.
   *H04W 52/02*   (2009.01)
   *H04W 12/00*   (2009.01)
   *H04W 76/14*   (2018.01)
   *H04L 12/28*   (2006.01)
   *H04W 48/16*   (2009.01)
   *H04W 4/80*    (2018.01)

(52) U.S. Cl.
   CPC ....... *H04W 48/16* (2013.01); *H04W 52/0225* (2013.01); *H04W 52/0251* (2013.01); *H04W 76/14* (2018.02); *G06F 1/26* (2013.01); *H04L 2012/2841* (2013.01); *H04W 4/80* (2018.02)

(56) References Cited

U.S. PATENT DOCUMENTS

| | | | | |
|---|---|---|---|---|
| 9,898,234 B2* | 2/2018 | Kondo | .................. | G06F 3/1204 |
| 9,949,270 B2* | 4/2018 | Tachiwa | .............. | H04W 72/048 |
| 10,133,524 B2* | 11/2018 | Goto | ...................... | G06F 3/1213 |
| 10,324,668 B2* | 6/2019 | Kawai | ...................... | H04W 4/80 |
| 10,348,952 B2* | 7/2019 | Ishikuri | ................. | H04W 76/16 |
| 2016/0073348 A1 | 3/2016 | Tsuzuki | | |
| 2017/0156103 A1 | 6/2017 | Auvray | | |
| 2018/0049257 A1 | 2/2018 | Liu et al. | | |

FOREIGN PATENT DOCUMENTS

| | | |
|---|---|---|
| JP | 2007-006157 A | 1/2007 |
| JP | 2016-208418 A | 12/2016 |
| JP | 2017-010499 A | 1/2017 |
| WO | 2016/127494 A1 | 8/2016 |

OTHER PUBLICATIONS

Chinese Office Action dated Mar. 2, 2020, in related Chinese Patent Application No. 201810695708.1 (with English translation).

* cited by examiner

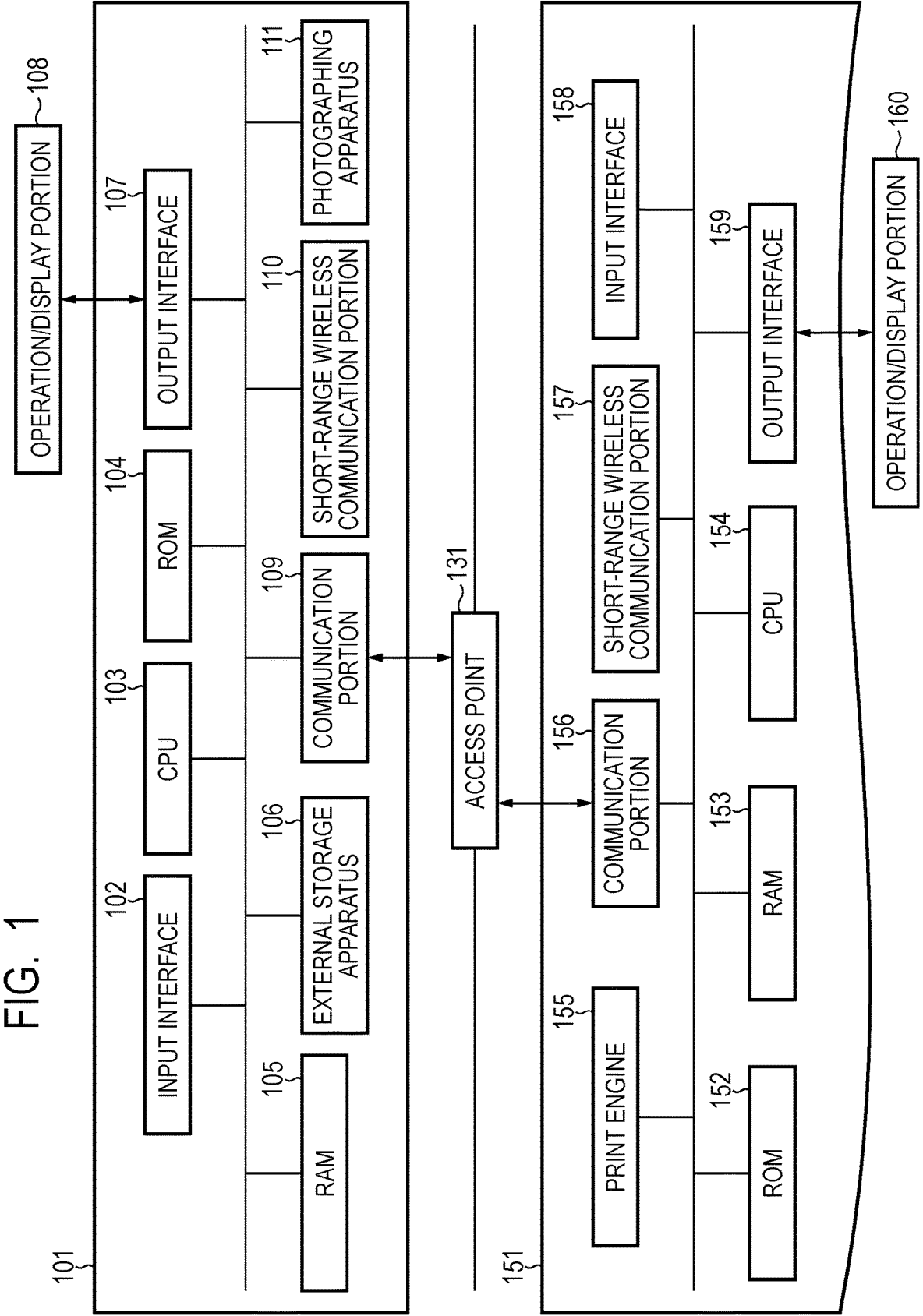

COMMUNICATION APPARATUS AND CONTROL METHOD THEREFOR

BACKGROUND OF THE INVENTION

Field of the Invention

The present invention relates to a communication system, and more particularly, to a communication apparatus, which is connected to an information processing apparatus including a short-range wireless communication portion, and a control method therefor.

Description of the Related Art

In recent years, short-range wireless communications using Bluetooth (trademark) have become widespread. For example, a smartphone or other such information processing apparatus performs short-range wireless communications to/from a printer or other such communication apparatus. In the communications using Bluetooth, roles including "central" and "peripheral" are defined as follows. A peripheral device is capable of periodically sending an advertising packet indicating its own device information to a peripheral apparatus, and waits for a connection request from a central device. The central device is capable of detecting an advertising packet, and issuing a connection request and a scan request to the peripheral device. However, under the Bluetooth standard, the peripheral device is not allowed to be simultaneously connected to a plurality of central devices. Therefore, when a peripheral device connected to one central device is to be connected to another central device via Bluetooth, it is required to disconnect communications that have already been established. In Japanese Patent Application Laid-Open No. 2016-208418, there is proposed a technology for disconnecting wireless communications using a wireless LAN, Bluetooth, and the like under various conditions.

In recent years, a printer or other such apparatus having a communication function (hereinafter also referred to as "communication apparatus") has an auto power-on/off function of turning on or off power supply to the apparatus automatically when a predetermined condition is satisfied in addition to a user's pressing of a power button for powering on or off. These functions can be enabled or disabled by the user. Under a powered-off state with an auto power-on function being enabled, it is often possible to perform communications via a wireless LAN and Bluetooth. When one of those wireless communications is carried out, the power supply to the apparatus is automatically turned on in general.

Japanese Patent Application Laid-Open No. 2016-208418 includes the description that second communications (Bluetooth) are disconnected when first communications (wireless LAN) are established. However, it is not described that the wireless communications are connected or disconnected depending on the power supply state of the communication apparatus. For example, in Bluetooth communications, only one external communication apparatus can be connected simultaneously. Therefore, even when the power supply to a printer is turned off, the printer remains being connected to the external communication apparatus via Bluetooth, which leads to a problem in that another terminal is inhibited from being connected to the printer via Bluetooth. It is important to appropriately control a connected state also in a communication scheme other than Bluetooth.

The present invention has been made in view of the related art, and has an object to provide a communication apparatus capable of appropriately controlling a connected state and a control method therefor.

SUMMARY OF THE INVENTION

The present invention has been made in view of the above-mentioned problems, and has the following configuration.

According to one embodiment of the present invention, there is provided a communication apparatus including: a first communication portion configured to perform wireless communications with an external apparatus based on a Bluetooth Low Energy communication scheme; and a first determiner configured to determine whether an auto power-on function of powering on the communication apparatus under a predetermined condition even when the communication apparatus is in a powered-off state is set to be enabled, wherein, when the first determiner determines that the auto power-on function is set to be enabled, the first communication portion disconnects connection to the external apparatus, which has been established based on the Bluetooth Low Energy communication scheme, in response to a power-off instruction, and transmits advertising information that allows a response based on the Bluetooth Low Energy communication scheme to be received.

Further features of the present invention will become apparent from the following description of exemplary embodiments with reference to the attached drawings.

BRIEF DESCRIPTION OF THE DRAWINGS

FIG. 1 is a diagram for illustrating a configuration of a communication system in a first embodiment of the present invention.

DESCRIPTION OF THE EMBODIMENTS

Figure 2A:
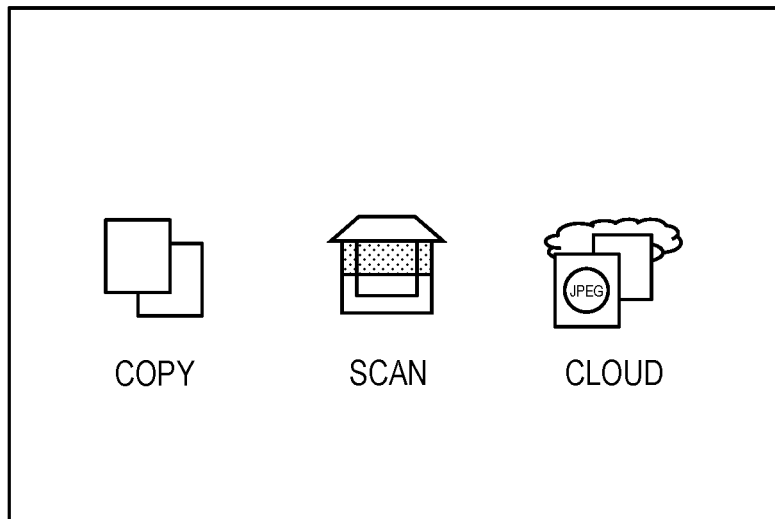
FIG. 2A is a diagram for illustrating a home screen as an example of the screen display of an operation/display portion 160 of a communication apparatus 151.

Preferred embodiments of the present invention will now be described in detail in accordance with the accompanying drawings.

Now, exemplary embodiments of the present invention are described with reference to the accompanying drawings.

However, it is to be understood that even changes and modifications appropriately made to the embodiments described below are included in the scope of the present invention based on the general knowledge of a person skilled in the art within a range that does not depart from the gist of the present invention.

First Embodiment

An information processing apparatus and a communication apparatus, which are included in a communication system in a first embodiment of the present invention, are described. The information processing apparatus is exemplified by a smartphone in the first embodiment. However, the first embodiment is not limited thereto, and can be applied to a mobile terminal, a laptop PC, a tablet terminal, a personal digital assistant (PDA), a digital camera, and other various apparatus. The communication apparatus is exemplified by a printer in the first embodiment. However, the first embodiment is not limited thereto, and can be applied to various apparatus as long as the apparatus have a communication function that allows wireless communications to/from the information processing apparatus. For example, printers to which the first embodiment can be applied include an ink-jet printer, a full-color laser beam printer, and a monochrome printer. The first embodiment can be applied not only to the printer but also to a copying machine, a facsimile apparatus, a mobile terminal, a smartphone, a laptop PC, a tablet terminal, a PDA, a digital camera, a music playback device, and a television set. In addition, the first embodiment can be applied to a multifunction peripheral (MFP) having a plurality of functions, for example, a copying function, a FAX function, and a printing function.

An information processing system or a communication system including the information processing apparatus in the first embodiment and the communication apparatus according to the first embodiment, which is capable of communicating to/from the information processing apparatus, is described with reference to a block diagram of FIG. 1. The first embodiment is described by taking the following configuration as an example. However, the first embodiment can be applied to an apparatus capable of communicating to/from the communication apparatus, and no particular limitations are intended to be imposed on functions thereof illustrated in FIG. 1.

[Configuration of System Including Information Processing Apparatus 101 and Communication Apparatus 151]

An information processing apparatus 101 in the first embodiment includes an input interface 102, a CPU 103, a ROM 104, a RAM 105, an external storage apparatus 106, an output interface 107, an operation/display portion 108, a communication portion 109, a short-range wireless communication portion 110, and a photographing apparatus 111. A smartphone or other such device is assumed to serve as the information processing apparatus 101, but the present invention is not limited to the smartphone. For example, the information processing apparatus 101 may be a personal computer, a so-called tablet terminal, or a digital camera having a communication function.

The input interface 102 includes a physical keyboard, a button, or a touch panel, and receives data input and an operation instruction from a user. The output interface 107 and the input interface 102 may have the same configuration, and may be configured to output a screen and receive an operation from the user with the same configuration.

The CPU 103 is a system controller, and controls the entire information processing apparatus 101. The ROM 104 stores control programs to be executed by the CPU 103, data tables, and fixed data including a preinstalled operating system (hereinafter referred to as "OS") program. In the first embodiment, the respective control programs stored in the ROM 104 control software execution of scheduling, task switching, interruption processing, and the like under the management of the preinstalled OS stored in the ROM 104.

The RAM 105 is formed of a static random access memory (SRAM) requiring backup power supply. The RAM 105 holds data owing to a primary battery (not shown) for data backup, and is therefore capable of storing important data including program control variables without volatilization. In addition, the RAM 105 is provided with a memory area for storing setting information on the information processing apparatus 101 and management data on the information processing apparatus 101. The RAM 105 is also used as a main memory and a work memory for the CPU 103.

The external storage apparatus 106 stores an application program to be executed by the CPU 103 to achieve an application for providing a printing execution function (hereinafter referred to as "print application"). The external storage apparatus 106 further stores different kinds of programs including a print information generation program for generating print information that can be interpreted by a communication apparatus 151 and an information transmission/reception control program for transmitting/receiving information to/from the communication apparatus 151 connected via the communication portion 109. The external storage apparatus 106 also stores different kinds of information to be used by those programs. In addition, the external storage apparatus 106 stores image data obtained from another information processing apparatus or the Internet via the communication portion 109.

The output interface 107 controls the operation/display portion 108 to display data and notify a state of the information processing apparatus 101.

The operation/display portion 108 includes a light emitting diode (LED) or a liquid crystal display (LCD). The operation/display portion 108 displays the data and notifies the state of the information processing apparatus 101. A software keyboard provided with keys including a numerical value input key, a mode setting key, an OK key, a cancel key, and a power key may be provided on the operation/display portion 108, to thereby receive input from the user via the operation/display portion 108. That is, a user operation may be received from the operation/display portion 108.

The communication portion 109 executes data communications by being connected to the communication apparatus 151 or other such apparatus. The communication apparatus 151 according to the first embodiment is a printer including a print engine. For example, the communication portion 109 is connectable to an access point (not shown) included in the communication apparatus 151. When the communication portion 109 is connected to the access point included in the communication apparatus 151, the information processing apparatus 101 and the communication apparatus 151 are enabled to communicate to/from each other. The communication portion 109 may communicate to/from the communication apparatus 151 directly via a wireless communication scheme, or may communicate to/from the communication apparatus 151 via an external access point (access point 131) provided outside the information processing apparatus 101 or the communication apparatus 151. Examples of the wireless communication scheme include Wireless Fidelity (Wi-Fi) (trademark) in conformity to the IEEE 802.11 series (including IEEE 802.11a, IEEE 802.11b, and IEEE 802.11g) and Bluetooth. Examples of the access point 131 include a wireless LAN router or other such device. In the first embodiment, a scheme in which the information processing apparatus 101 and the communication apparatus 151 are directly connected to each other without the intermediation of an external access point is referred to as "direct connection scheme". A scheme in which the information processing apparatus 101 and the communication apparatus 151 are connected to each other via an external access point is referred to as "infrastructure connection scheme".

The short-range wireless communication portion 110 is a device configured to execute data communications by being wirelessly connected to the communication apparatus 151 or other such apparatus including a short-range wireless communication portion in a short distance, and performs communications via a communication scheme different from that of the communication portion 109. The short-range wireless communication portion 110 is connectable to a short-range wireless communication portion 157 included in the communication apparatus 151. The "short-range wireless communication" represents a communication scheme in which wireless communications are performed in a distance shorter than a predetermined distance. In the first embodiment, Bluetooth Low Energy (BLE) is used as the communication scheme of the short-range wireless communication portion 110.

The photographing apparatus 111 converts an image acquired by a photographing element into digital data. The digital data is temporarily stored in the RAM 105, then converted into a predetermined image format by a program executed by the CPU 103, and stored in the external storage apparatus 106 as the image data.

The communication apparatus 151 according to the first embodiment includes a ROM 152, a RAM 153, a CPU 154, a print engine 155, a communication portion 156, the short-range wireless communication portion 157, an input interface 158, an output interface 159, and an operation/display portion 160. The communication apparatus 151 is assumed to be an MFP or other such device, but is not limited to the MFP. For example, the communication apparatus 151 may be a single-function printer, a scanner, or other such input/output device, as well as a storage apparatus or a dedicated device having a specific function.

The communication portion 156, which is an example of a second communication portion, includes an access point (not shown) for connection to the information processing apparatus 101 or other such apparatus as the access point included in the communication apparatus 151. The access point is connectable to the communication portion 109 of the information processing apparatus 101. The communication portion 156 may directly communicate to/from the information processing apparatus 101 via a wireless communication scheme, or may communicate to/from the information processing apparatus 101 via the external access point 131 in place of the built-in access point. Examples of the communication scheme include Wi-Fi in conformity to the IEEE 802.11 series (including IEEE 802.11a, IEEE 802.11b, and IEEE 802.11g) and Bluetooth. The communication portion 156 may also include hardware functioning as the access point, or may operate as the access point by software for causing the communication portion 156 to function as the access point.

The RAM 153 is formed of a DRAM requiring backup power supply. The RAM 153 holds data by being supplied with power for data backup (not shown). Therefore, the RAM 153 is capable of storing important data including program control variables without volatilization. The RAM 153 is also used as a main memory and a work memory for the CPU 154, and stores different kinds of information and a reception buffer for temporarily storing the print information received from the information processing apparatus 101.

The ROM 152 stores control programs to be executed by the CPU 154, data tables, and fixed data including an OS program. In the first embodiment, the respective control programs stored in the ROM 152 control software execution of scheduling, task switching, interruption processing, and the like under the management of the preinstalled OS stored in the ROM 152. The control program also includes programs for executing procedures illustrated in, for example, FIG. 6 and FIG. 8. In addition, the ROM 152 is provided with a memory area for storing setting information on the communication apparatus 151, management data on the communication apparatus 151, and other such data required to be held while the power is not supplied. The CPU 154 is a system controller, and controls the entire communication apparatus 151.

The print engine 155 forms an image on a paper sheet or other such recording medium through use of an ink or other such recording agent based on information stored in the RAM 153 or a print job received from the information processing apparatus 101, and outputs a printing result. At this time, the print job transmitted from the information processing apparatus 101 has a large transmission data amount, and requires high-speed communications. Therefore, the print engine 155 receives the print job via the communication portion 156, which can perform communications at a speed higher than the short-range wireless communication portion 157. The short-range wireless communication portion 157 is described later in detail with reference to FIG. 3.

The input interface 158 includes a power key or other such physical keys, a physical keyboard, a button, or a touch panel, and receives data input and an operation instruction from a user. The output interface 159 and the input interface 158 may have the same configuration, and may be configured to output a screen and receive an operation from the user with the same configuration. The output interface 159 controls the operation/display portion 160 to display data and notify a state of the communication apparatus 151.

The operation/display portion 160 includes a light emitting diode (LED) or a liquid crystal display (LCD). The operation/display portion 160 displays the data and notifies the state of the communication apparatus 151. A software keyboard provided with keys including a numerical value input key, a mode setting key, an OK key, a cancel key, and a power key may be provided on the operation/display portion 160, to thereby receive input from the user via the operation/display portion 160.

User Interface Screen Example

Figure 2B:
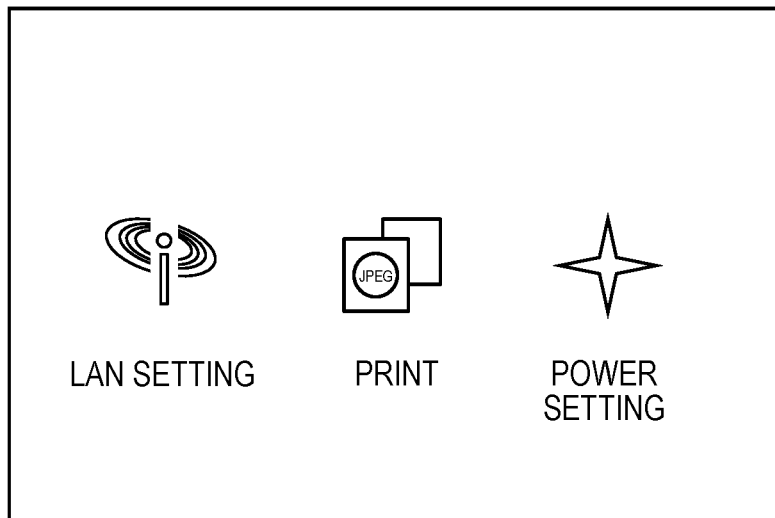
FIG. 2B is a diagram for illustrating a screen for displaying different functions.
Figure 2C:
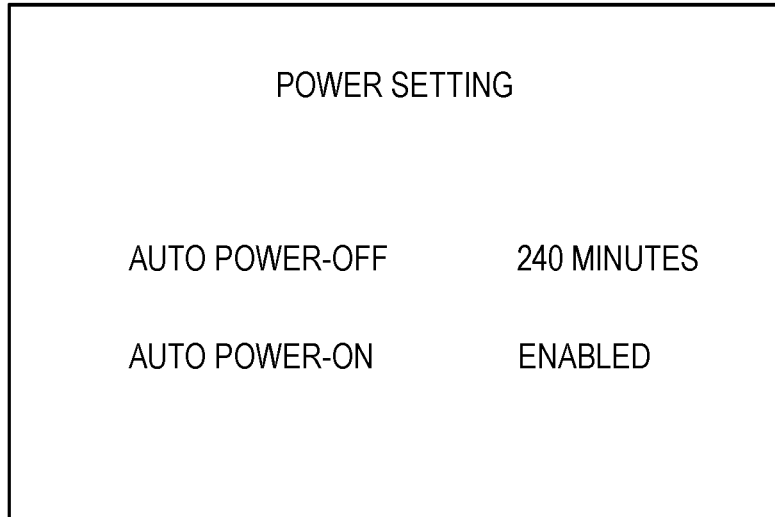
FIG. 2C is a diagram for illustrating a screen to be displayed when power setting is selected.

FIG. 2A to FIG. 2C are diagrams for schematically illustrating examples of the screen display of the operation/display portion 160 of the communication apparatus 151. FIG. 2A is the diagram for illustrating a home screen in a state (idle state) under which printing, scanning, and other such operation are on standby after the communication apparatus 151 is powered on. Menu display, various settings, and function execution for copying, scanning, and a cloud function using Internet communications can be performed through a key operation or a touch panel operation. Functions different from those illustrated in FIG. 2A can be displayed seamlessly by being caused to transition from the home screen of FIG. 2A through a key operation or a touch panel operation. FIG. 2B is an example of the different functions, and is the diagram for illustrating a screen that allows printing and LAN setting to be executed and power setting to be changed. FIG. 2C is a diagram for illustrating a screen to be displayed when the power setting is selected on the screen of FIG. 2B. The screen of FIG. 2C allows settings of an auto power-on function and an auto power-off function to be changed. In FIG. 2C, auto power-off to be triggered 240 minutes later and auto power-on are selected in the power setting. That is, in the case of FIG. 2C, the auto power-off function and the auto power-on function are both set to be "enabled". The settings performed through the user interface illustrated in FIG. 2A to FIG. 2C are stored in, for example, the RAM 153 or the ROM 152.

Under the setting with "the auto power-off function being enabled", the communication apparatus 151 is automatically brought to a powered-off state. Specifically, the power is automatically brought to an off state without the power key being pressed when a predetermined condition is satisfied, for example, when there is no operation request sent from the outside and the respective functions including a printing function and a reading function are not used for a predetermined time period.

Under the setting with "the auto power-on function being enabled", when the communication apparatus 151 satisfies a predetermined condition, the communication apparatus 151 is automatically brought to a powered-on state without the power key being pressed. Examples of the predetermined condition include a case in which the communication apparatus 151 has received a print job or an instruction for printing and a case in which the communication apparatus 151 has received an activation instruction for the communication apparatus 151 or information for activation. The powered-on state represents a normal power state (normal power mode), in which the power is supplied to the respective components of the communication apparatus 151. Under the powered-on state, all the functions of the communication apparatus 151 including the printing function are executable.

The powered-off state of the communication apparatus 151 is not strictly a state under which the power is supplied to none of the elements (units). That is, the power is not supplied to the print engine, while the power is supplied at least to a main CPU (CPU 154) of the communication apparatus 151 to enable the pressing of the power key to be detected. The powered-off state triggered by the auto power-off function and the powered-off state triggered by the user's pressing of the power key are basically the same except that a power supply state in the powered-off state differs depending on whether or not the auto power-on function is enabled. Under the powered-off state with the auto power-on function being enabled, the power is supplied not only to the CPU 154 but also to a device configured to communicate to/from the outside (that is, a device configured to perform communications has been activated). Meanwhile, under the powered-off state with the auto power-on function being set to be disabled, the power not is supplied to a device configured to communicate to/from the outside. When the communication apparatus 151 enters the powered-off state with the auto power-on function being set to be enabled, the CPU 154 waits for the pressing of the power key, communications from the outside, or an operation request under a state with an AC plug being plugged. Therefore, the powered-off state in this case may also be referred to as "power-saving state (exhibiting power consumption smaller than in the normal power state)".

Specifically, under the powered-off state with the auto power-on function being enabled, the power is also supplied to the short-range wireless communication portion 157 configured to perform BLE communications. When a wireless LAN function is in an on state, the power is also supplied to the communication portion 156 configured to perform wireless LAN communications under the powered-off state with the auto power-on function being enabled. Meanwhile, when the wireless LAN function is in an off state, the power is not supplied to the communication portion 156. In the same manner as in the communication portion 156, the power may not be supplied to the short-range wireless communication portion 157 when a BLE communication function is set off.

[Outline of Short-Range Wireless Communication Portion]

Figure 3:
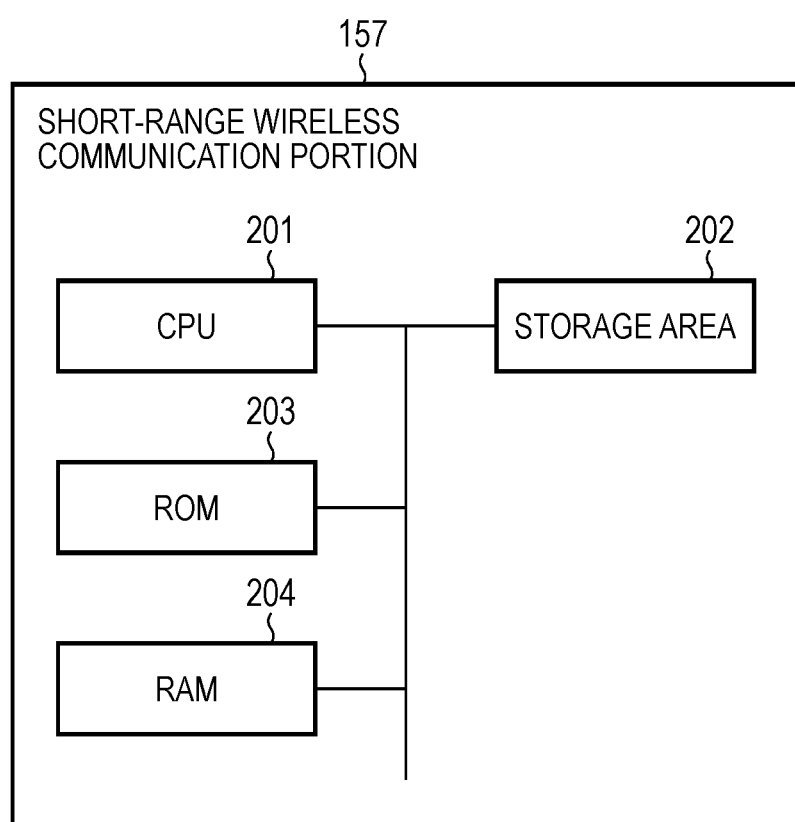
FIG. 3 is a block diagram for illustrating a configuration of a short-range wireless communication portion 157 in the first embodiment.

The details of the short-range wireless communication portion 157, which is an example of a first communication portion, are illustrated in FIG. 3. The short-range wireless communication portion 157 is a communication device for wireless connection to the information processing apparatus 101 or other such apparatus in a short distance. The short-range wireless communication portion 157 controls the short-range wireless communications, and may therefore be recognized as a communication controller. In the first embodiment, Bluetooth Low Energy (BLE) is used as the communication scheme of the short-range wireless communication portion 157. The short-range wireless communication portion 157 and the CPU 154 communicate to/from each other via I$^2$C or other such bus interface. The short-range wireless communication portion 157 includes a CPU 201, a storage area 202, a ROM 203, and a RAM 204. The storage area 202 is an area provided in, for example, a RAM accessible to the CPU 154. The storage area 202 is also accessible to the information processing apparatus 101 via the short-range wireless communication portion 110. The RAM 204 is formed of a DRAM requiring backup. The RAM 204 holds data by being supplied with power for data backup (not shown), and is therefore capable of storing important data including program control variables without volatilization. The RAM 204 is also used as a main memory and a work memory for the CPU 201. The ROM 203 stores control programs to be executed by the CPU 201, data tables, and fixed data including an OS program.

An external HDD, an SD card, or other such storage device may be attached to the communication apparatus 151 as an optional device. The information stored in the communication apparatus 151 may be stored in the storage device.

It has been described above how processing functions are allotted to the information processing apparatus 101 and the communication apparatus 151 as an example, but the present invention is not particularly limited to the above-mentioned allotment pattern, and another pattern may be employed.

[Outline of Advertising Packet (Advertising Information)]

An outline of an advertising packet used under the BLE standard is described. In the initial phase of communications via BLE, a peripheral device (communication apparatus 151 in this example) that provides a service transmits an advertising packet periodically. A central device (information processing apparatus 101 in this example) that has detected the advertising packet examines the content of the advertising packet. In order to be connected, the central device sends a connect request packet to enter a connected state.

Figure 9:
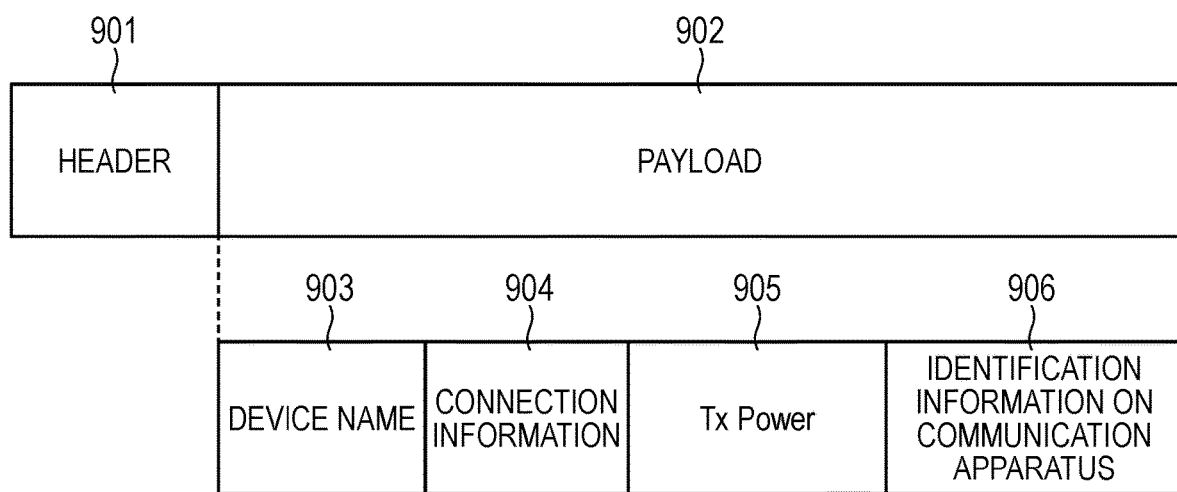
FIG. 9 is a diagram for illustrating an example of a structure of an advertising packet (advertising information).

FIG. 9 is a diagram for illustrating an example of a structure of the advertising packet (advertising information) to be broadcast to the periphery of the communication apparatus 151 by the short-range wireless communication portion 157 of the peripheral device.

When entering an advertising state, the peripheral device periodically broadcasts the advertising packet to the periphery at an advertising interval. The advertising packet includes a header 901 and a payload 902. The central device receives the advertising packet, to thereby be able to recognize the presence of the peripheral device. A PDU Header (PDU header 901) of the advertising packet includes Adv PDU information for designating the type of the advertising packet and information on the size of the payload 902. Any one of four types including ADV_IND, ADV_DIRECT_IND, ADV_NONCONN_IND, and ADV_SCAN_IND is designated in the Adv PDU information.

After transmitting an advertising packet in which the PDU information of ADV_IND or ADV_SCAN_IND is designated, the peripheral device maintains a standby state for a fixed time period in order to receive a connect request or a scan request from the central device. When receiving the scan request under the standby state, the peripheral device transmits scan response information. Then, the peripheral device is brought to a connected state to the central device by responding to connect request information received from the central device which has received the scan response information. The scan response information basically has the same structure as that of the advertising information, and a PDU type included in the header 901 of the scan response information is SCAN_RSP.

After transmitting an advertising packet in which ADV_NONCONN_IND is designated, the peripheral device does not enter the standby state for receiving the connect request or scan request information from the central device. Therefore, even when receiving a connect request from the central device, the peripheral device does not return a response, and therefore does not enter the connected state to the central device. The remaining type, namely, ADV_DIRECT_IND, does not relate to the first embodiment, and hence a description thereof is omitted herein.

The payload 902 stores a device name 903 serving as identification information and loaded profile information including connection information 904 for connection to the communication apparatus 151 via BLE and transmission power (Tx power) 905 for the advertising information. Identification information 906 on the communication apparatus may be included in the advertising information. The identification information 906 on the communication apparatus corresponds to a MAC address of the communication apparatus, service information on the communication apparatus, the presence or absence of an operation panel (operation screen) provided to the communication apparatus, and an SSID and a password of the access point included in the communication apparatus. As information stored in the payload 902 of the scan response information, information different from the advertising information may be stored as necessary.

The advertising information (advertising packet) and the scan response information (SCAN_RSP) are separately described above. However, the scan response information basically has the same structure as that of the advertising information. Therefore, scan request information transmitted in response to first advertising information is also referred to as "second advertising information". For example, the first advertising information includes an IP address of the communication apparatus 151, a port used for printing, information indicating a specific printing service, information relating to transmission power for the advertising information, and identification information on the short-range wireless communication portion 157. Meanwhile, the second advertising information includes identification information (UUID) on the communication apparatus 151 and information relating to functions and hardware provided to the communication apparatus 151 (for example, operation panel information indicating whether or not an operation panel is provided). In the case of such a configuration, for example, the print application is designed to handle the second advertising information. Therefore, in the following description, the advertising information handled by the print application is the second advertising information.

[Outline of GATT Communications]

Next, an outline of communications via Generic Attribute Profile (GATT) under the BLE standard is described. In the first embodiment, the "connection" under the BLE standard means connection via GATT communications.

GATT defines the following two roles based on a transfer source and a transfer destination of data.

(1) Client

A client transmits a request to a server, and receives a response from the server. In the first embodiment, the information processing apparatus 101 serves as a GATT client.

(2) Server

A server returns a response when receiving a request from the client. In the first embodiment, the communication apparatus 151 serves as a GATT server.

The GATT server is a device configured to store data or state information. The GATT client can read or write data from/to the GATT server.

Figure 7:
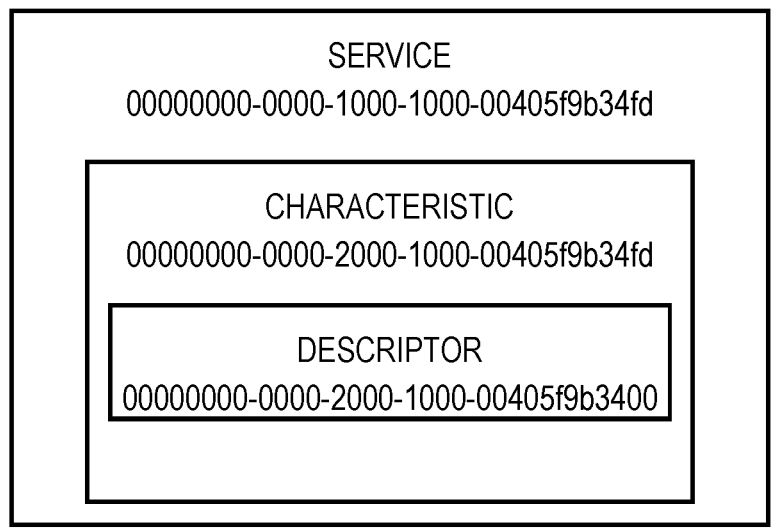
FIG. 7 is a diagram for illustrating a data format of GATT.

Next, a data format of GATT is described. Data of GATT includes three elements called "service", "characteristic", and "descriptor". A relationship among those three elements is illustrated in FIG. 7, but the descriptor may be omitted.

The service, the characteristic, and the descriptor can each be identified by a 32-digit UUID (universally unique identifier). However, one defined by the Bluetooth SIG standard is expressed in four digits. The UUID is used as an identifier for uniquely identifying an object on software. The UUID has a 128-bit numerical value, but is generally expressed as a hexadecimal number, for example, 550e8400-e29b-41d4-a716-446655440000.

The characteristic has a single value for each characteristic. The descriptor has an attribute value to be used when information additional to the characteristic is required. The service, the characteristic, and the descriptor can each have a read/write attribute and a security attribute set for the GATT client.

The GATT client can read or write data from/to the value of each characteristic by designating the UUID of each of the service and the characteristic. However, whether or not data can be read or written depends on the read/write attribute set for each of the service and the characteristic.

Next, an outline of pairing in BLE is described. It is determined based on the security attribute set for the characteristic whether or not the corresponding characteristic requires pairing. In a case where the security attribute set for the characteristic requires pairing, even when the corresponding characteristic allows the reading, data cannot be read as long as the pairing has not been carried out. In order to establish the BLE communications corresponding to the security attribute, a parent device and a child device in BLE are required to register each other and exchange or store a key. Such a procedure is called "pairing".

[Outline of Processing Sequence]

Figure 4:
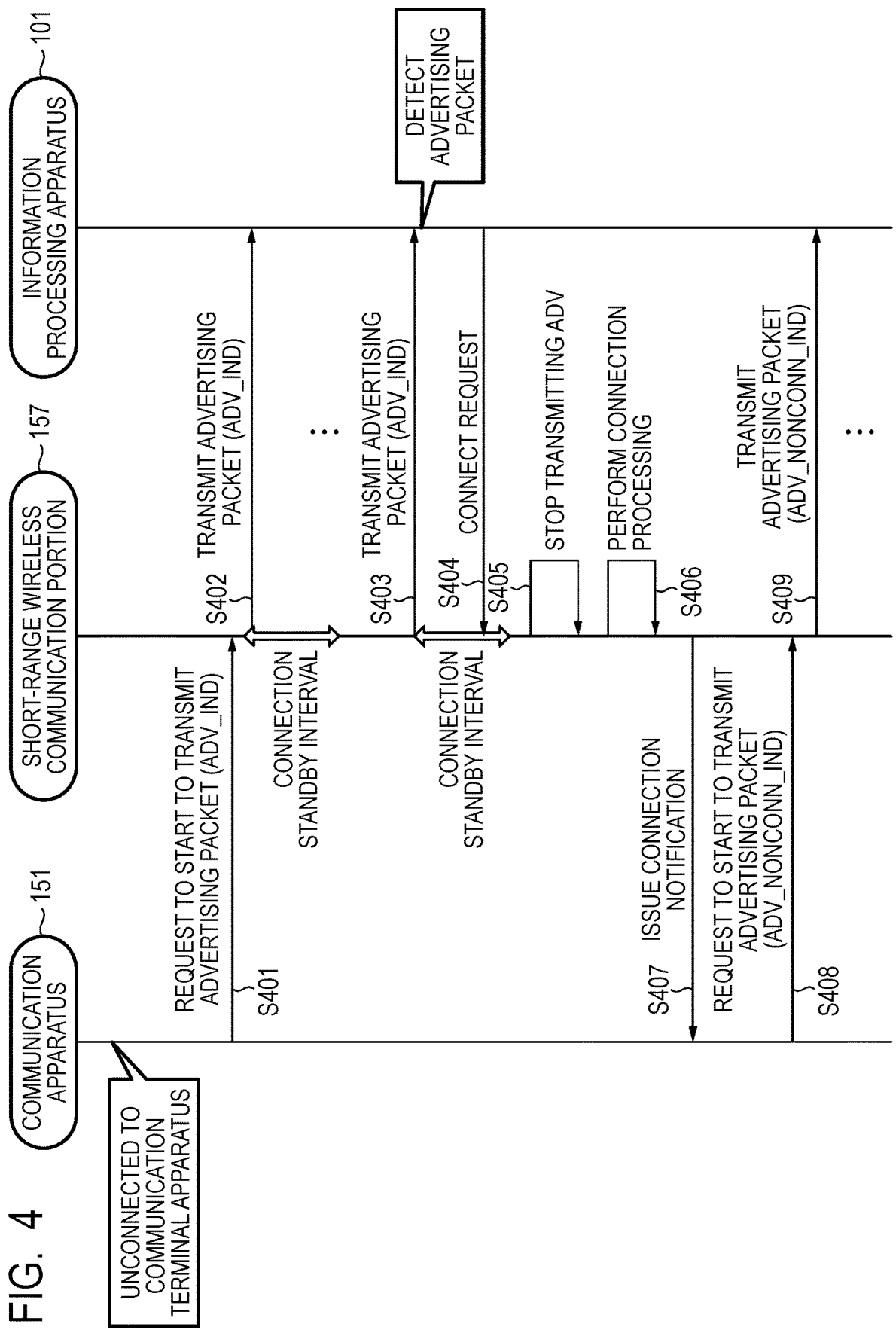
FIG. 4 is a sequence diagram for illustrating connection processing via Bluetooth in the first embodiment.
Figure 5:
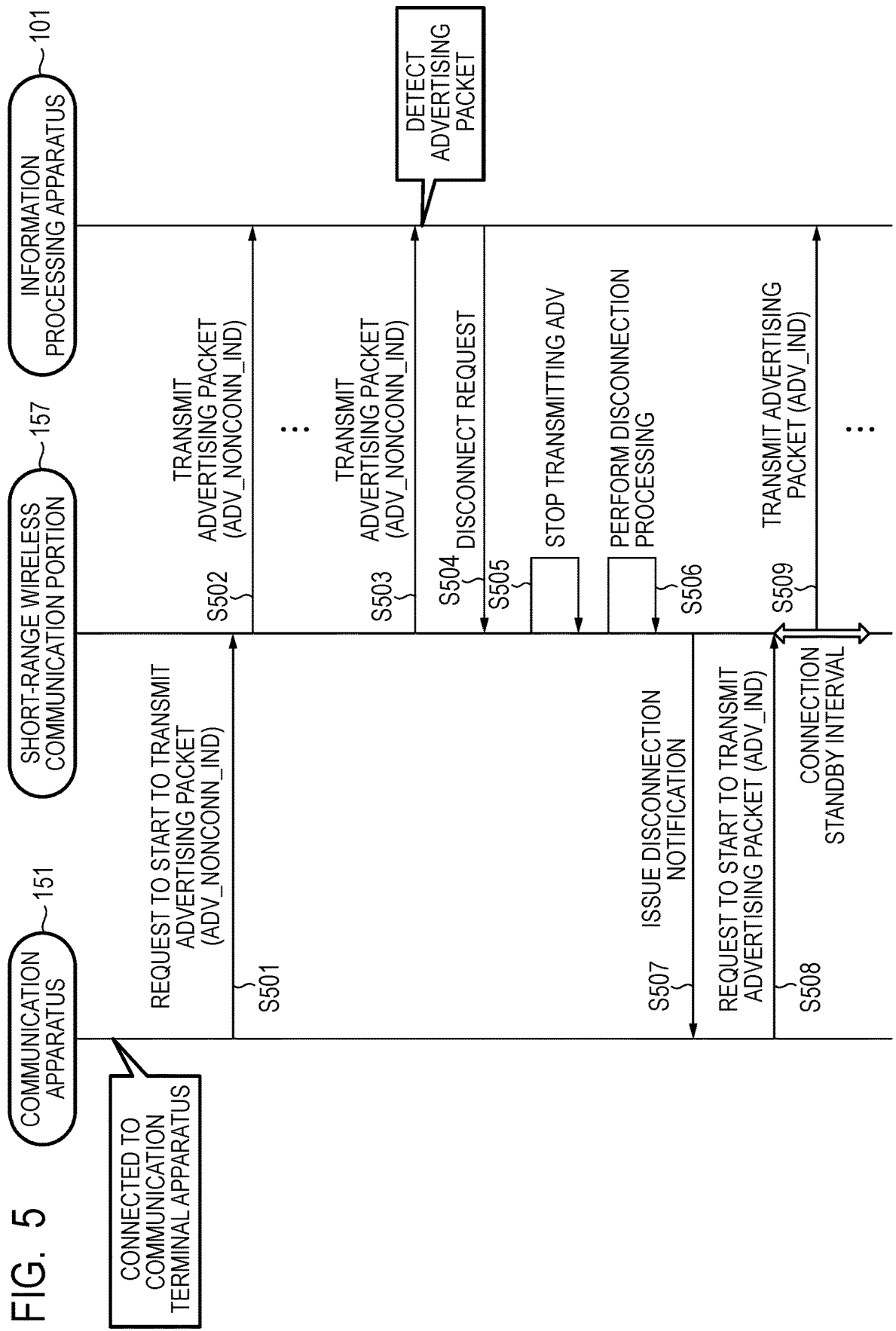
FIG. 5 is a sequence diagram for illustrating disconnection processing via Bluetooth in the first embodiment.

With reference to FIG. 4 and FIG. 5, sequences of transmission processing for an advertising packet, connection processing, and disconnection processing, which are performed by the communication apparatus 151, the short-range wireless communication portion 157, and the information processing apparatus 101, are described. In FIG. 4 and FIG. 5, the communication apparatus 151 corresponds to a peripheral device, and the information processing apparatus 101 corresponds to a central role. The short-range wireless communication portion 157 is included in the communication apparatus 151, but is illustrated separately from the communication apparatus 151 in order to clarify the following description. Specifically, in FIG. 4 and FIG. 5, the communication apparatus 151 represents the CPU 154 included in the communication apparatus 151. Therefore, FIG. 4 and FIG. 5 are diagrams for illustrating the processing sequences among the CPU 154 of the communication apparatus 151, the short-range wireless communication portion 157 of the communication apparatus 151, and the information processing apparatus 101.

FIG. 4 is a diagram for illustrating the sequence of the connection processing via BLE performed between the communication apparatus 151 and the information processing apparatus 101. This processing is achieved by, for example, the CPU 154 included in the communication apparatus 151, the CPU 201 included in the short-range wireless communication portion 157 of the communication apparatus 151, and the CPU 103 included in the information processing apparatus 101 each reading and executing different kinds of programs stored in the ROM, the RAM, and other such storage area. First, the communication apparatus 151 and the information processing apparatus 101 are in an unconnected state.

In Step S401, the communication apparatus 151 requests the short-range wireless communication portion 157 to transmit an advertising packet having the ADV_IND type. The short-range wireless communication portion 157, which has received the transmission request, starts to transmit (broadcast) the advertising packet having the ADV_IND type in Step S402, and after transmitting the packet, maintains a connection standby state for a predetermined time period. The short-range wireless communication portion 157 periodically carries out a series of processing of Step S402.

In Step S403, in the same manner as in Step S402, the short-range wireless communication portion 157 transmits the advertising packet, and maintains a connection standby state for a predetermined time period. At this time, the information processing apparatus 101 detects the advertising packet. When determining that the device (communication apparatus) that has transmitted the advertising packet is a device to be connected to, the information processing apparatus 101 transmits connect request information to the short-range wireless communication portion 157 in Step S404. The information processing apparatus 101 may determine that the device that has transmitted the advertising packet is the device to be connected to when the received advertising packet includes identification information indicating that the device is a predetermined communication apparatus 151.

When receiving the connect request information during a connection standby interval, the short-range wireless communication portion 157 stops transmitting the advertising packet in Step S405, and carries out connection processing for connecting to the information processing apparatus 101 in Step S406. When the connection processing of Step S406 is completed (when connection via the GATT communications is established), the short-range wireless communication portion 157 issues a connection notification to the communication apparatus 151 in Step S407.

In this case, only one pair are allowed to be connected to each other for communications at a time, and hence the short-range wireless communication portion 157 is required to transmit an advertising packet having the ADV_NON-CONN_IND type, which does not involve the connection standby state. Therefore, in Step S408, the communication apparatus 151 requests the short-range wireless communication portion 157 to transmit an advertising packet having the ADV_NONCONN_IND type. The short-range wireless communication portion 157, which has received the transmission request, starts to transmit the advertising packet having the ADV_NONCONN_IND type in Step S409. After transmitting the packet, the short-range wireless communication portion 157 avoids entering the connection standby state with respect to the information processing apparatus 101. The short-range wireless communication portion 157 periodically carries out a series of processing of Step S409.

FIG. 5 is a diagram for illustrating the sequence of the disconnection processing via BLE performed between the communication apparatus 151 and the information processing apparatus 101. The short-range wireless communication portion 157 is included in the communication apparatus 151, but is illustrated separately from the communication apparatus 151 in order to clarify the following description in the same manner as in FIG. 4. That is, FIG. 5 is a diagram for illustrating the processing sequence among the CPU 154 of the communication apparatus 151, the short-range wireless communication portion 157 of the communication apparatus 151, and the information processing apparatus 101. This processing is achieved by, for example, the CPU 154 included in the communication apparatus 151, the CPU 201 included in the short-range wireless communication portion 157 of the communication apparatus 151, and the CPU 103 included in the information processing apparatus 101 each reading and executing different kinds of programs stored in the ROM, the RAM, and other such storage area.

The communication apparatus 151 and the information processing apparatus 101 are in a connected state, and hence in Step S501, the communication apparatus 151 requests the short-range wireless communication portion 157 to transmit an advertising packet having the ADV_NONCONN_IND type. The short-range wireless communication portion 157, which has received the transmission request, starts to transmit the advertising packet having the ADV_NONCONN_IND type in Step S502. After transmitting the packet, the short-range wireless communication portion 157 avoids entering the connection standby state. The short-range wireless communication portion 157 periodically carries out a series of processing of Step S502. In Step S503, in the same manner as in Step S502, the short-range wireless communication portion 157 carries out the transmission processing for the advertising packet.

At this time, the information processing apparatus 101 detects the advertising packet. When determining that it is a device to be disconnected from, the information processing apparatus 101 transmits disconnect request (disconnection request) information to the short-range wireless communication portion 157 in Step S504.

When receiving the disconnect request information, the short-range wireless communication portion 157 stops transmitting the advertising packet in Step S505, and carries out disconnection processing for disconnecting from the information processing apparatus 101 in Step S506.

When the disconnection processing of Step S506 is completed, in Step S507, the short-range wireless communication portion 157 issues a disconnection notification to the communication apparatus 151. After the disconnection, the connection via BLE is allowed again, and hence it is required to transmit an advertising packet having the ADV_IND type, which involves the connection standby state. Therefore, in Step S508, the communication apparatus 151 requests the short-range wireless communication portion 157 to transmit an advertising packet having the ADV_IND type. The short-range wireless communication portion 157, which has received the transmission request, starts to transmit the advertising packet having the ADV_IND type in Step S509. After transmitting the packet, the short-range wireless communication portion 157 maintains a connection standby state for a predetermined time period. The short-range wireless communication portion 157 periodically carries out a series of processing of Step S509.

In this case, the transmission processing for the advertising packet, the connection processing, and the disconnection processing, which are performed by the information processing apparatus 101, the short-range wireless communication portion 157, and the communication apparatus 151, are described above as an example, but the present invention is not particularly limited to the above-mentioned allotment pattern, and another pattern may be employed.

[Power-Off Processing]

Figure 6:
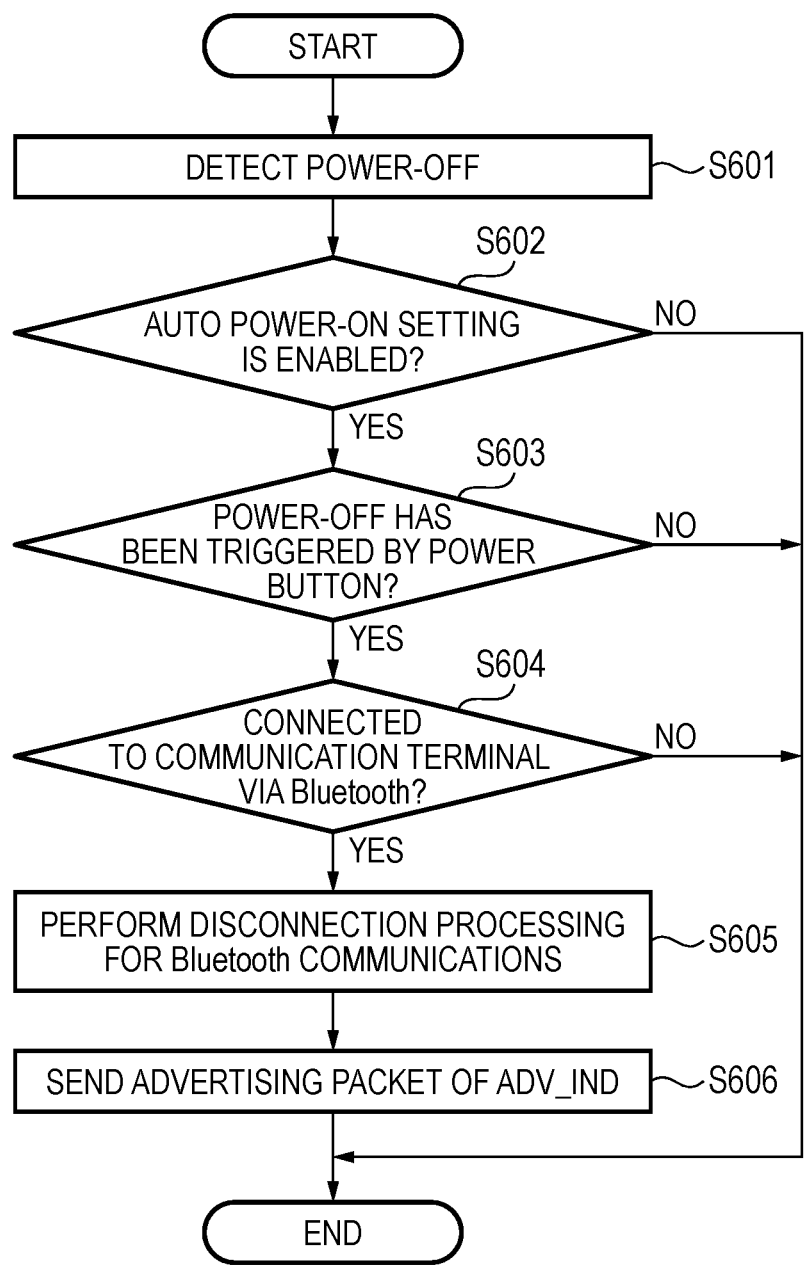
FIG. 6 is a flowchart for illustrating the disconnection processing via Bluetooth performed when a powered-off state is detected in the first embodiment.

Processing relating to the first embodiment is described with reference to FIG. 6. FIG. 6 illustrates a sequence of power-off detection processing of the communication apparatus 151. When the power is turned off, the communication apparatus 151 is powered off after the procedure of FIG. 6 is executed. This processing is achieved by, for example, the CPU 154 included in the communication apparatus 151 and the CPU 201 included in the short-range wireless communication portion 157 of the communication apparatus 151 each reading and executing different kinds of programs stored in the ROM, the RAM, and other such storage area. That is, those CPUs function as a power supply controller.

In Step S601, the CPU 154 of the communication apparatus 151 detects a power-off request. All power-off requests including a request when the user presses a power button of the communication apparatus 151 and a request when the auto power-off function is carried out after a lapse of a predetermined time period are detected. The procedure of FIG. 6 may be started with a trigger of the detection of the power-off request.

After the power-off request is detected, in Step S602, the CPU 154, which functions as a first determiner of the communication apparatus 151, refers to a set value of the auto power-on function to determine which of "enabled" and "disabled" the auto power-on function is. When the auto power-on function is disabled, the CPU 154 brings the processing of FIG. 6 to an end, and powers off the communication apparatus 151 (while maintaining the power supply to the main CPU). That is, when determining in Step S602 that the auto power-on function is not enabled (that is, the auto power-on function is disabled), the CPU 154 brings the sequence of FIG. 6 to an end without carrying out Step S603 to Step S606 of FIG. 6. After that, the CPU 154 carries out normal power-off processing (first power-off processing) of the communication apparatus 151. In the case of the first power-off processing, the power is supplied to the CPU 154, while the power is not supplied to the short-range wireless communication portion 157. Therefore, the BLE communications using the short-range wireless communication portion 157 are stopped, which also inhibits the transmission of an advertising information and the GATT communications. Meanwhile, when the auto power-on function is enabled, the procedure advances to Step S603.

In Step S603, the CPU 154, which functions as a second determiner of the communication apparatus 151, determines a method of requesting the power to be turned off. That is, the CPU 154 can also determine which has triggered a power-off instruction detected in Step S601. Examples of the method of requesting the power to be turned off include the execution of the auto power-off function after a lapse of a time period and the user's pressing of the power button of the communication apparatus 151. When the determination of Step S603 results in NO, that is, when the auto power-off function is carried out after a lapse of a time period, the CPU 154 brings the sequence to an end without carrying out Step S604 to Step S606 of FIG. 6. This is because when BLE connection using the short-range wireless communication portion 157 is active, it is required to maintain the BLE connection due to the possibility that the power may have been turned off against the user's intention while the user is supposed to use the communication apparatus 151. Therefore, in this case, after the processing of FIG. 6, the CPU 154, which functions as the power supply controller, executes second power-off processing. In the second power-off processing, the power supply to the short-range wireless communication portion 157 is maintained. That is, in power-off processing (second power-off processing) based on the auto power-off function with the auto power-on function being enabled, the power is supplied not only to the CPU 154 but also to the short-range wireless communication portion 157. In short, the BLE connection is allowed between the communication apparatus and the external device. Therefore, this second power-off state is also referred to as "power-saving mode". When the CPU 154 determines in Step S603 that the power-off request has been issued by the user pressing the power button, the procedure advances to Step S604. This is because it is possible to determine that the user has the clear intention of stopping using the communication apparatus 151.

In Step S604, the CPU 154 of the communication apparatus 151 determines whether or not the information processing apparatus 101 and the communication apparatus 151 are in a BLE-connected state (in a GATT-communication state). When the CPU 154 determines in Step S604 that the information processing apparatus 101 and the communication apparatus 151 are not in the BLE-connected state, the CPU 154 brings the processing of FIG. 6 to an end without executing Step S605 and Step S606. After that, the CPU 154 executes the second power-off processing while maintaining the power supply to the short-range wireless communication portion 157.

When the CPU 154 determines in Step S604 that the information processing apparatus 101 and the communication apparatus 151 are in the BLE-connected state (GATT-communication state), the procedure advances to Step S605. With the auto power-on function being set to be enabled, the communications using the short-range wireless communication portion 157 are active even when the communication apparatus 151 is powered off. Therefore, even when the user is intended to have powered off the communication apparatus 151 by pressing the power button thereof, the BLE connection using the short-range wireless communication portion 157 is maintained. As a result, the connected state to the information processing apparatus 101 is maintained unless the disconnection processing for the connection is carried out, which inhibits the connection processing to another external communication apparatus from being carried out.

After the CPU 154 determines in Step S604 that the information processing apparatus 101 and the communication apparatus 151 are in the BLE-connected state, in Step S605, the CPU 201 of the short-range wireless communication portion 157 disconnects the BLE connection to the information processing apparatus 101 based on the disconnection request received from the CPU 154.

In Step S606, the CPU 201 of the short-range wireless communication portion 157 sends the advertising packet having the ADV_IND type. That is, the advertising information indicating that a connection request is waited for (namely, connection is being waited for) is broadcast. The communication apparatus 151 is allowed to transition to the connection standby state by sending the advertising packet of ADV_IND, and can therefore be connected to an external apparatus other than the information processing apparatus 101 via BLE. In Step S606 and the subsequent steps, the BLE connection to the external apparatus other than the information processing apparatus 101 is established in the processing of Step S404 and the subsequent steps illustrated in FIG. 4.

As described above, in the first embodiment, when the auto power-on function is set to be enabled, the power supply to the short-range wireless communication portion 157 is maintained. That is, when there is a possibility that the power may be turned on with a trigger of the wireless communications via BLE, the power supply to the short-range wireless communication portion 157 is maintained even after receiving the power-off instruction.

When the auto power-on function is set to be enabled and the power-off instruction based on the auto power-off function is received, the power supply to the short-range wireless communication portion 157 and the BLE-connected state are maintained. When the auto power-on function is set to be enabled and the power-off instruction based on the operation of the power button is received, it is determined whether or not the BLE connection (GATT communications) is currently active. When the BLE-connected state is maintained, the BLE connection is disconnected. With this configuration, for example, when an operator performs a power-off operation with auto power-on setting being enabled, the BLE connection that has already been established is disconnected, which creates room for the BLE connection to another apparatus. That is, after the BLE connection (GATT communications) is disconnected, the disconnected communication apparatus broadcasts the advertising information of ADV_IND, and can therefore be connected to another apparatus via BLE.

In the first embodiment, under the powered-off state, the communication portion 156 configured to perform connection via the wireless LAN performs the following operation unlike the operation of the short-range wireless communication portion 157 configured to perform the BLE connection. That is, under the powered-off state with the auto power-on function being enabled and the wireless LAN function being enabled, the communication portion 156 is temporarily restarted, and the wireless LAN function is allowed to be operated after the restart. The communication portion 156 is inhibited from transmitting a beacon until the restart is completed. Under the powered-off state with the auto power-on function being enabled and the wireless LAN function being disabled, the communication portion 156 is in a stopped state in the first place, and hence the stopped state is maintained. Under the powered-off state with the auto power-on function being disabled and the wireless LAN function being enabled, the power supply to the communication portion 156 is stopped, and the communication portion 156 stops performing communications. Under the powered-off state with the auto power-on function being disabled and the wireless LAN function being disabled as well, the communication portion 156 is in a stopped state in the first place, and hence the stopped state is maintained. In short, whether or not to supply the power to the communication portion 156 depends on whether or not the auto power-on function is enabled and whether or not the wireless LAN function is enabled.

Second Embodiment

Next, a second embodiment of the present invention is described. The configurations of the communication apparatus 151 and the information processing apparatus 101 and the processing flow of the connection therebetween are the same as those of the first embodiment, and hence descriptions thereof are omitted. Points different from those of the first embodiment are mainly described below. The second embodiment is different from the first embodiment in the flow of the disconnection processing for the BLE connection.

Figure 8:
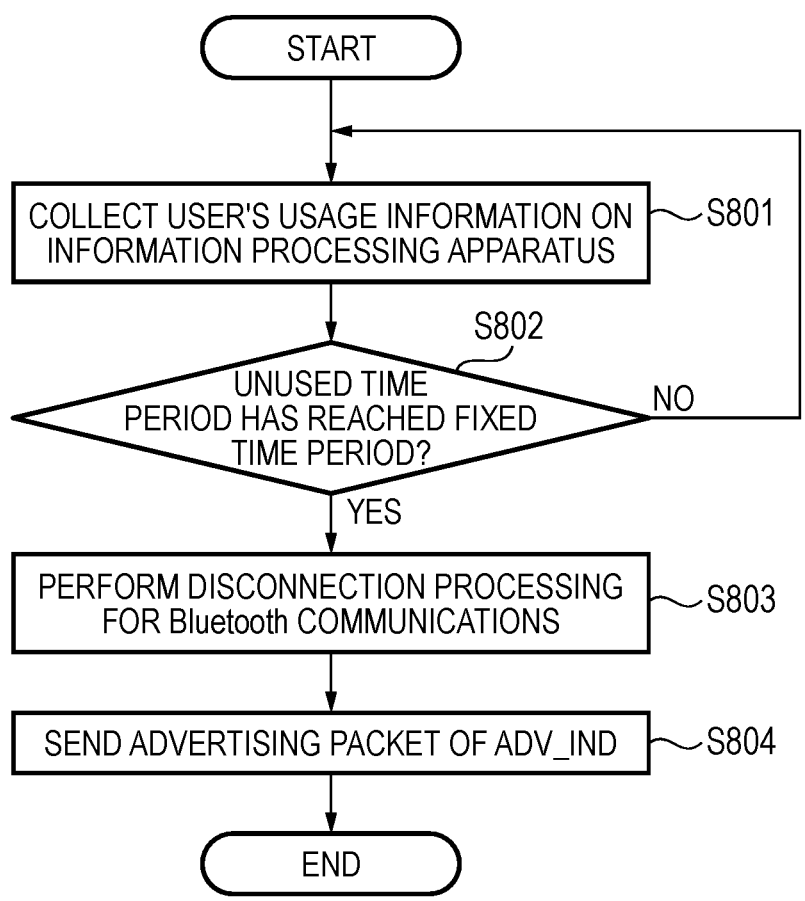
FIG. 8 is a flowchart for illustrating the disconnection processing via Bluetooth under a powered-on state in a second embodiment of the present invention.

With reference to FIG. 8, the second embodiment relating to the disconnection processing for the BLE connection performed by the communication apparatus 151 is described. As described with reference to FIG. 6, the disconnection processing in the first embodiment has the sequence of performing determination for disconnection processing when the communication apparatus 151 detects a power-off request. However, in the second embodiment, the determination for the disconnection processing for disconnecting from the information processing apparatus 101 is performed when the communication apparatus 151 is in a powered-on state. In FIG. 8, it is assumed that the communication apparatus 151 and the information processing apparatus 101 have been paired via BLE and are allowed to perform the GATT communications in an area having the security attribute requiring pairing. The processing of FIG. 8 is achieved by, for example, the CPU 154 included in the communication apparatus 151 and the CPU 201 included in the short-range wireless communication portion 157 of the communication apparatus 151 each reading and executing different kinds of programs stored in the ROM, the RAM, and other such storage area.

In Step S801, the short-range wireless communication portion 157 uses the GATT communications to collect the user's usage information on the information processing apparatus 101 in response to an instruction received from the CPU 154. Specifically, the short-range wireless communication portion 157 acquires, as the user's usage information, unused time period information on a time period during which the user is not using the information processing apparatus 101 (information on time period during which the user is not operating the information processing apparatus 101). The GATT communications are used to periodically transmit the unused time period information during which the user is not operating the information processing apparatus 101 from the information processing apparatus 101 to the communication apparatus 151, to thereby allow the communication apparatus 151 to collect the unused time period information on the information processing apparatus 101. The unused time period may refer to, for example, a continuously unused time period. Once the information processing apparatus 101 is operated, the unused time period may be remeasured from that point in time.

After the unused time period information is collected in Step S801, the CPU 154 included in the communication apparatus 151 determines in Step S802 whether or not the unused time period during which the user is not using the information processing apparatus 101 has reached a fixed time period. Examples of the method of determining whether or not the fixed time period has been reached include a method of determining that the fixed time period has been reached based on the unused time period information transmitted from the information processing apparatus 101. It is also possible for the CPU 154 to determine whether or not the fixed time period has been reached by measuring or acquiring a time at which the unused time period information being periodically transmitted by the information processing apparatus 101 via the GATT communications stops being transmitted.

When determining in Step S802 that the time period during which the user is not using the information processing apparatus 101 has not reached the fixed time period, the CPU 154 returns to Step S801 to collect the time information. When the CPU 154 determines in Step S802 that the unused time period during which the user is not using the information processing apparatus 101 has reached the fixed time period, in Step S803, the short-range wireless communication portion 157 disconnects the BLE connection to the information processing apparatus 101 based on the disconnection request received from the CPU 154.

Then, in Step S804, the short-range wireless communication portion 157 sends the advertising packet having the ADV_IND type in response to an instruction received from the CPU 154. The communication apparatus 151 is allowed to transition to the connection standby state by sending the advertising packet having the ADV_IND type, and can therefore be connected to an external communication apparatus other than the information processing apparatus 101 via BLE.

The procedure for the processing of FIG. 8 focuses on the cancellation of the pairing triggered by the fact that the unused time period has reached the fixed time period. Even while the loop of Step S801 and Step S802 is performed, the communication apparatus 151 simultaneously executes regular processing steps of, for example, communicating to/from the information processing apparatus 101 and providing the functions.

According to the above-mentioned configuration, a situation in which the user is not using the communication apparatus 151 and the information processing apparatus 101 is determined to disconnect the connection via BLE, which allows the connection to another external communication apparatus. When the information processing apparatus 101 is used again after the disconnection, reconnection to the communication apparatus 151 via BLE is allowed. Therefore, it is possible to provide the function of BLE without having the user aware of the connection or the disconnection, which can improve usability.

The present invention is not limited solely to the above-mentioned embodiments, and can be appropriately changed within the appended claims and within the scope equivalent to the appended claims based on the technical spirit of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to appropriately control the connected state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-127834 filed Jun. 29, 2017, and 2018-082464 filed Apr. 23, 2018, which are hereby incorporated by reference herein in their entirety.

What is claimed is:

1. A communication apparatus comprising:
a first communication portion configured to perform wireless communications with an external apparatus based on a Bluetooth Low Energy communication scheme; and
at least one processor configured to cause the communication apparatus to act as a first determiner that determines whether an auto power-on function of powering on the communication apparatus under a predetermined condition even when the communication apparatus is in a powered-off state is set to be enabled,
wherein, in a case where the first determiner determines that the auto power-on function is set to be enabled, the first communication portion disconnects, in response to a power-off instruction, connection to the external apparatus, which has been established based on the Bluetooth Low Energy communication scheme, and transmits advertising information that allows a response based on the Bluetooth Low Energy communication scheme to be received.

2. The communication apparatus according to claim 1, wherein the at least one processor is configured to cause the communication apparatus to act as a second determiner that determines whether the power-off instruction is an instruction based on a user operation,
wherein, in a case where the first determiner determines that the auto power-on function is set to be enabled and the second determiner determines that the power-off instruction is the instruction based on the user operation, the first communication portion disconnects the connection to the external apparatus, which has been established based on the Bluetooth Low Energy communication scheme, and transmits the advertising information that allows the response based on the Bluetooth Low Energy communication scheme to be received.

3. The communication apparatus according to claim 2, wherein, in a case where the first determiner determines that the auto power-on function is set to be enabled and the second determiner determines that the power-off instruction is not an instruction based on a user operation, the first communication portion avoids disconnecting the connection to the external apparatus, which has been established based on the Bluetooth Low Energy communication scheme.

4. The communication apparatus according to claim 1, wherein the advertising information that allows the response to be received includes advertising information that allows a connection request based on the Bluetooth Low Energy communication scheme to be received.

5. The communication apparatus according to claim 1, further comprising a power supply controller configured to bring the communication apparatus to the powered-off state based on the power-off instruction,
wherein, in a case where the first determiner determines that the auto power-on function is set to be disabled, the power supply controller brings the communication apparatus to a first powered-off state being a state that inhibits communications based on the Bluetooth Low Energy communication scheme from being performed by the first communication portion, and
wherein, in a case where the first determiner determines that the auto power-on function is set to be enabled, the power supply controller brings the communication apparatus to a second powered-off state being a state that allows the communications based on the Bluetooth Low Energy communication scheme to be performed by the first communication portion.

6. The communication apparatus according to claim 5, wherein, in a case where the first determiner determines that the auto power-on function is set to be disabled, the power supply controller brings the communication apparatus to the first powered-off state, to thereby inhibit the first communication portion from transmitting the advertising information based on the Bluetooth Low Energy communication scheme.

7. The communication apparatus according to claim 5, wherein the first powered-off state includes a state that allows pressing of a power button of the communication apparatus to be detected.

8. The communication apparatus according to claim 5, wherein the second powered-off state includes a state that allows the advertising information to be transmitted via the Bluetooth Low Energy communication scheme.

9. The communication apparatus according to claim 1, wherein the communication apparatus is powered on when receiving predetermined information as the predetermined condition.

10. The communication apparatus according to claim 2, wherein the instruction based on the user operation includes pressing of a power button performed by a user.

11. The communication apparatus according to claim 1, wherein the connection established based on the Bluetooth Low Energy communication scheme includes connection based on Generic Attribute Profile.

12. The communication apparatus according to claim 1, further comprising a second communication portion configured to perform wireless communications with an external apparatus based on a Wi-Fi communication scheme,
wherein, in a case where the auto power-on function is set to be enabled and a Wi-Fi communication function is set to be enabled, the second communication portion is allowed to execute the communications based on the Wi-Fi communication scheme even when the communication apparatus is in the powered-off state.

13. A communication apparatus comprising:
a communication portion configured to perform wireless communications with an external apparatus based on a predetermined communication scheme; and
at least one processor configured to cause the communication apparatus to act as a first determiner and a second determiner, wherein the first determiner determines whether an auto power-on function of powering on the communication apparatus under a predetermined condition even when the communication apparatus is in a powered-off state is set to be enabled, and
the second determiner determines whether a power-off instruction is an instruction based on a user operation,
wherein, in a case where the auto power-on function is set to be enabled and the second determiner determines that the power-off instruction is the instruction based on the user operation, the communication portion disconnects, in response to a power-off instruction, connection to the external apparatus, which has been established based on the predetermined communication scheme.

14. A control method for a communication apparatus, the control method comprising:
performing wireless communications with an external apparatus based on a Bluetooth Low Energy communication scheme; and
determining whether an auto power-on function of powering on the communication apparatus under a predetermined condition even when the communication apparatus is in a powered-off state is set to be enabled;
wherein, in a case where it is determined that the auto power-on function is set to be enabled, connection to the external apparatus, which has been established based on the Bluetooth Low Energy communication scheme, is disconnected in response to a power-off instruction, and advertising information that allows a response based on the Bluetooth Low Energy communication scheme to be received is transmitted.

* * * * *